US009203275B2

(12) United States Patent
Kanada et al.

(10) Patent No.: US 9,203,275 B2
(45) Date of Patent: Dec. 1, 2015

(54) STATOR FOR ROTATING MACHINE, HOLDER FOR USE WITH STATOR, ROTATING MACHINE, AND AUTOMOBILE

(71) Applicants: Kazuma Kanada, Mie (JP); Wataru Ito, Mie (JP); Hironori Kato, Mie (JP)

(72) Inventors: Kazuma Kanada, Mie (JP); Wataru Ito, Mie (JP); Hironori Kato, Mie (JP)

(73) Assignees: KABUSHIKI KAISHA TOSHIBA, Tokyo (JP); TOSHIBA INDUSTRIAL PRODUCTS MANUFACTURING CORPORATION, Mie-Gun (JP)

( * ) Notice: Subject to any disclaimer, the term of this patent is extended or adjusted under 35 U.S.C. 154(b) by 317 days.

(21) Appl. No.: 13/667,653

(22) Filed: Nov. 2, 2012

(65) Prior Publication Data

US 2013/0106250 A1    May 2, 2013

(30) Foreign Application Priority Data

Nov. 2, 2011 (JP) ................................. 2011-241119

(51) Int. Cl.
*H02K 3/50* (2006.01)
*H02K 7/14* (2006.01)
*H02K 3/52* (2006.01)
(Continued)

(52) U.S. Cl.
CPC ............ *H02K 3/522* (2013.01); *B60L 11/1803* (2013.01); *B60L 11/1864* (2013.01); *H02K 7/006* (2013.01); *B60L 2220/50* (2013.01); *H02K 2203/09* (2013.01)

(58) Field of Classification Search
CPC ..... H02K 2203/09; H02K 3/52; H02K 3/522; H02K 7/006; B60L 11/1864; B60L 11/1803; B60L 2220/50

USPC ........................................... 310/71, 67 R, 91
See application file for complete search history.

(56) References Cited

U.S. PATENT DOCUMENTS

| 6,707,186 | B2 * | 3/2004 | Oppitz ........................... 310/71 |
| 7,219,417 | B2 * | 5/2007 | Kobayashi et al. ............. 29/623 |
| 7,453,175 | B2 * | 11/2008 | Nakanishi et al. .......... 310/68 B |

(Continued)

FOREIGN PATENT DOCUMENTS

| CN | 102142740 A | 8/2011 |
| CN | 102201708 A | 9/2011 |

(Continued)

OTHER PUBLICATIONS

Chinese Office Action issued in related Chinese Patent Application No. 201210433897.X mailed Sep. 18, 2014, 6 pages (with translation.).

(Continued)

*Primary Examiner* — Alex W Mok
(74) *Attorney, Agent, or Firm* — Baker Botts L.L.P.

(57) ABSTRACT

A stator of a rotating machine includes a stator core, a plurality of winding wires wound on the stator core, a first bus ring, a second bus ring, and a holder device. The first bus rings each has a first radial dimension and selectively connects electrically with each of the wires. The second bus ring has a second radial dimension different from the first radial dimension and selectively connects electrically with each of the wires. The holder device holds the first and the second bus rings. The holder device includes a first and a second support portion. The first support portion supports a plurality of the first bus rings aligned along an axial direction of the stator core. The second support portion supports the second bus ring on a radially outward or inward side of the first bus rings.

11 Claims, 7 Drawing Sheets

(51) Int. Cl.
*B60L 11/18* (2006.01)
*H02K 7/00* (2006.01)

(56) References Cited

U.S. PATENT DOCUMENTS

| | | | |
|---|---|---|---|
| 7,936,099 B2* | 5/2011 | Staudemann et al. | 310/71 |
| 7,960,880 B2* | 6/2011 | Hino et al. | 310/68 D |
| 8,546,986 B2* | 10/2013 | Marchitto et al. | 310/71 |
| 2004/0135457 A1* | 7/2004 | Holzheu et al. | 310/179 |
| 2006/0043806 A1* | 3/2006 | Torii et al. | 310/71 |
| 2006/0138883 A1* | 6/2006 | Yagai et al. | 310/71 |
| 2007/0080592 A1* | 4/2007 | Ohta et al. | 310/71 |
| 2008/0018193 A1* | 1/2008 | Kobayashi | 310/219 |
| 2008/0024029 A1* | 1/2008 | Shiono et al. | 310/194 |
| 2009/0127945 A1* | 5/2009 | Hino et al. | 310/63 |
| 2009/0127948 A1* | 5/2009 | Shimizu et al. | 310/71 |
| 2009/0256439 A1* | 10/2009 | Inoue et al. | 310/71 |
| 2010/0026115 A1* | 2/2010 | Kinjou et al. | 310/71 |
| 2010/0255686 A1* | 10/2010 | Doo et al. | 439/34 |
| 2011/0175471 A1* | 7/2011 | Marchitto et al. | 310/71 |
| 2011/0215662 A1* | 9/2011 | Lee et al. | 310/71 |
| 2011/0234031 A1* | 9/2011 | Kato | 310/71 |
| 2011/0297474 A1* | 12/2011 | Aono et al. | 180/443 |
| 2012/0235524 A1* | 9/2012 | Sasaki et al. | 310/71 |

FOREIGN PATENT DOCUMENTS

| | | |
|---|---|---|
| JP | 2005-160137 A | 6/2005 |
| JP | 2007-259553 A | 10/2007 |
| JP | 2008-22620 | 1/2008 |
| JP | 2008-259259 A | 10/2008 |
| JP | 2011-234553 A | 11/2011 |
| WO | 2011/108735 A1 | 9/2011 |

OTHER PUBLICATIONS

Office Action issued in related Chinese Application No. 201210433879.X, mailed Apr. 14, 2015, 24 pages (with translation.).

Office Action issued in related Japanese Application No. 2011-241119, mailed Jun. 30, 2015, 6 pages (with translation.).

* cited by examiner

STATOR FOR ROTATING MACHINE, HOLDER FOR USE WITH STATOR, ROTATING MACHINE, AND AUTOMOBILE

CROSS-REFERENCE TO RELATED APPLICATION(S)

This application is based upon and claims the benefit of priority from Japanese Patent Application No. 2011-241119, filed on, Nov. 2, 2011 the entire contents of which are incorporated herein by reference.

FIELD

Embodiments disclosed herein generally relate to a stator for a rotating machine, a holder for use with the stator, a rotating machine provided with the stator, and an automobile provided with the rotating machine.

BACKGROUND

One example of a rotating machine for vehicle application typically provided in electric automobiles or hybrid automobiles employs wiring connection in which the 3 phases of winding wires wound on the stator winding are connected through a bus ring for each of the 3 phases. More specifically, each of the wire windings establish a star connection using a U-phase bus ring, V-phase bus ring, W-phase bus ring, and a neutral point bus ring.

Rotating machines for vehicle application faces a demand for compactness. Efforts have been made to meet such demands by disposing the 4 bus rings coaxially with respect to the stator. However, such efforts still have not achieved the required compactness since the coaxial arrangement has resulted in a radial configuration which was too bulky.

DETAILED DESCRIPTION

In one embodiment, a stator of a rotating machine includes a stator core, a plurality of winding wires wound on the stator core, a plurality of first bus rings, a second bus ring, and a holder. The first bus rings each has a first radial dimension and selectively establishes electrical connection with each of the winding wires. The second bus ring has a second radial dimension different from the first radial dimension and selectively establishes electrical connection with each of the winding wires. The holder holds the first bus rings and the second bus ring. The holder includes a first support portion and a second support portion. The first support portion supports the plurality of first bus rings aligned along an axial direction of the stator core. The second support portion supports the second bus ring on a radially outward side or a radially inward side of the first bus rings.

Figure 5:
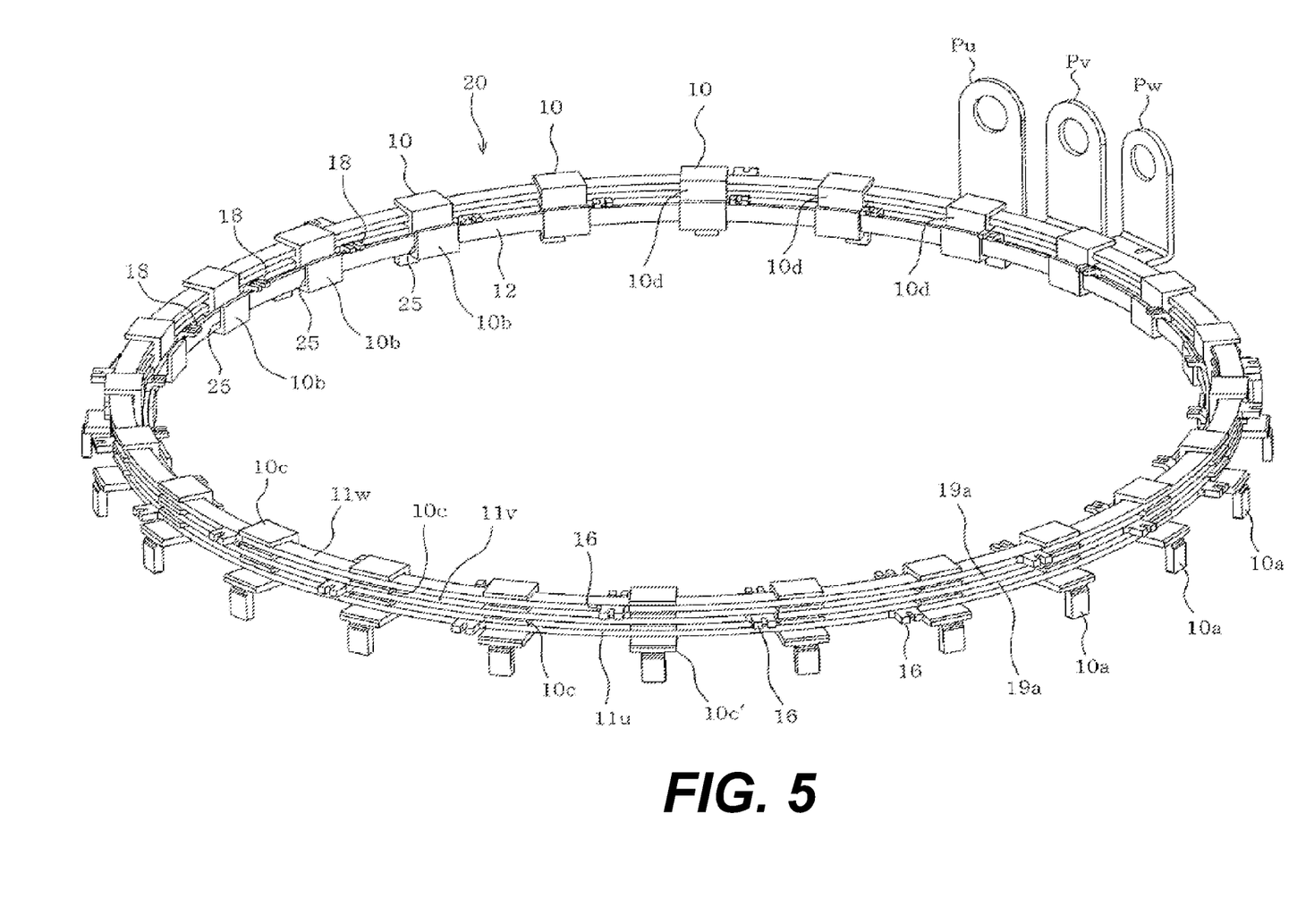
FIG. 5 is a perspective view with each of the bus rings assembled into a unit by way of the holder member.
Figure 6A:
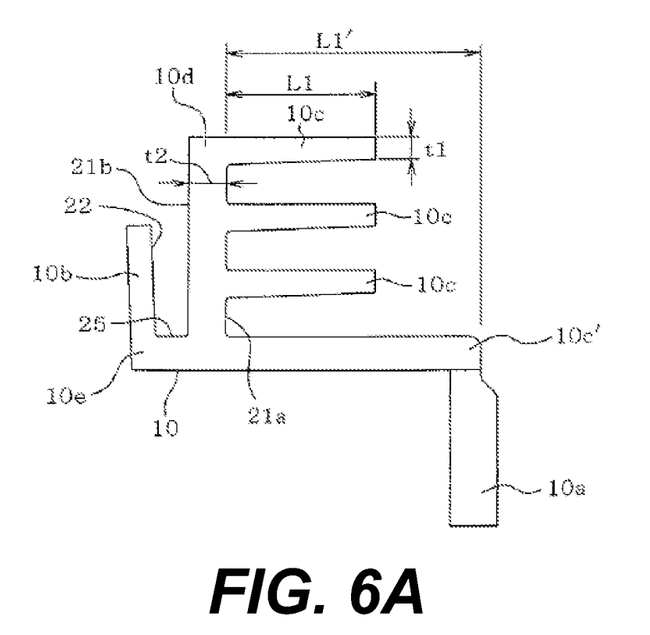
FIG. 6A is an enlarged side view of the holder member.
Figure 6B:
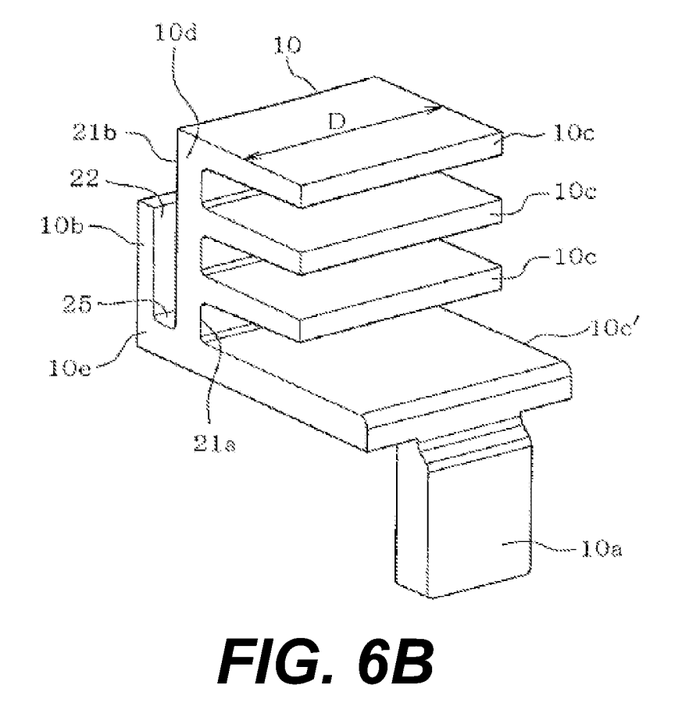
FIG. 6B is an enlarged perspective view of the holder member.
Figure 7:
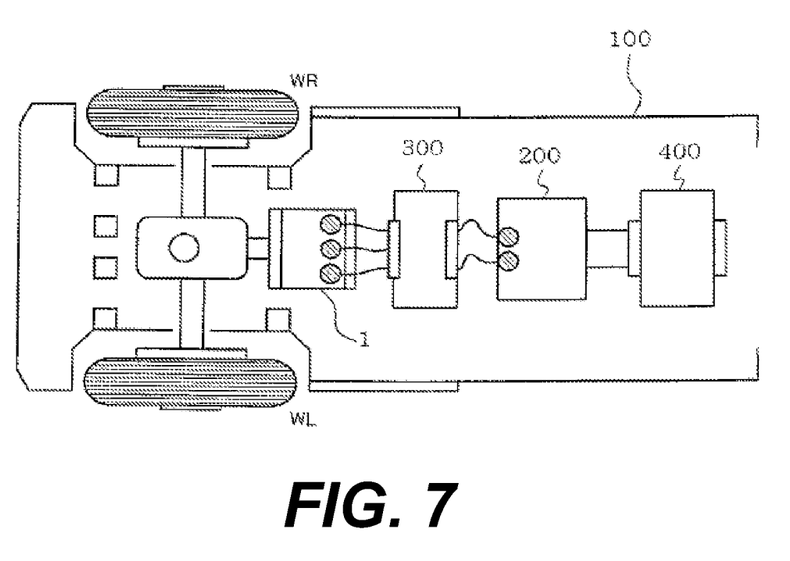
FIG. 7 is a functional block diagram schematically indicating the configuration of an electric automobile.

Referring to FIGS. 1 to 7, one embodiment will be described through an inverter driven electric motor for electric automobile application. FIG. 7 illustrates an automobile provided with electric motor 1 comprising a rotating machine.

Figure 2:
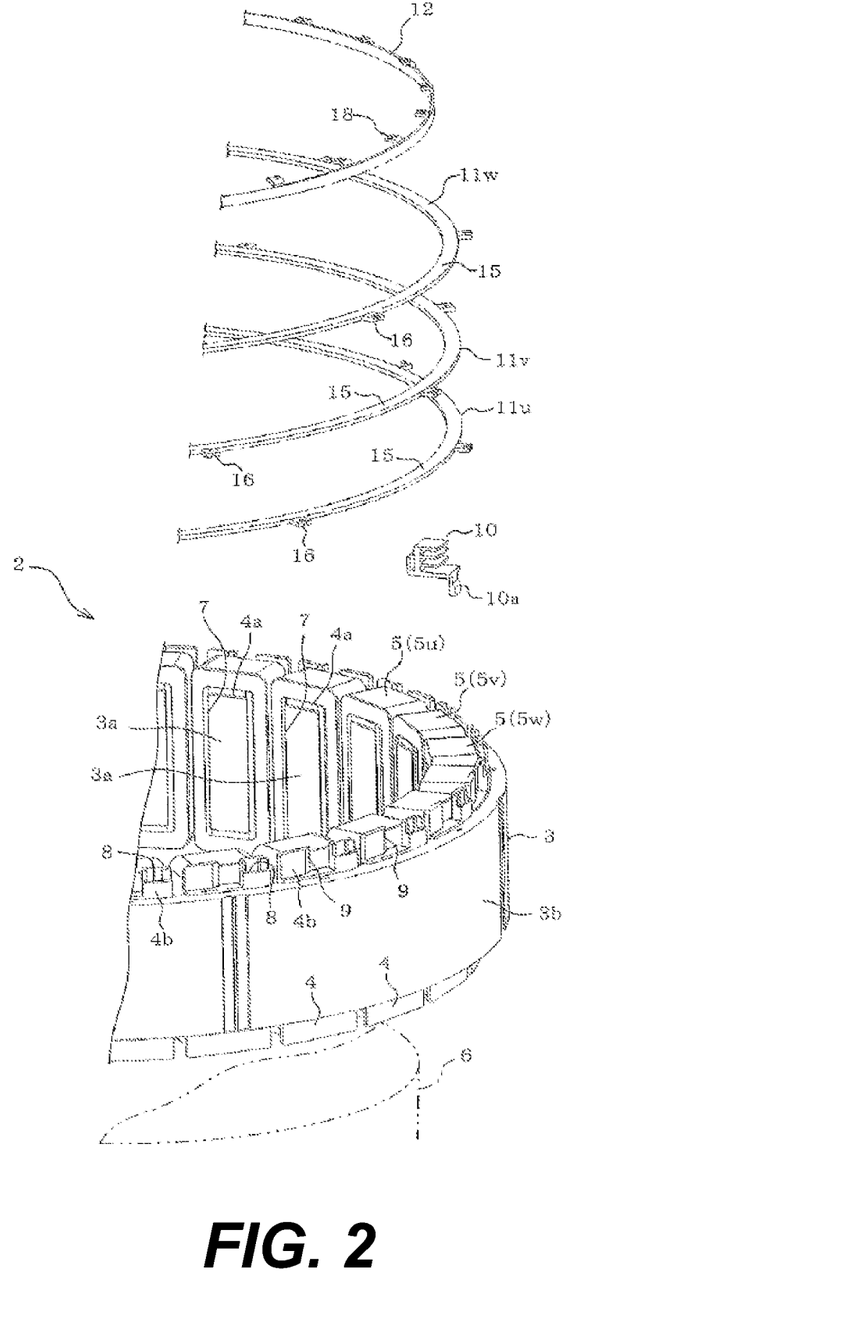
FIG. 2 is a perspective exploded view with bus rings and holder members removed from the stator.

As shown in FIG. 2, stator 2 of electric motor 1 is provided with a substantially cylindrical stator core 3 which comprises a stack of multiple annular electromagnetic steel sheets. Stator core 3 includes a cylindrical yoke 3b and multiple teeth 3a, such as 24 in number, provided at equal circumferential spacing on the inner peripheral portion of yoke 3b.

Each of teeth 3a is shaped as a quadrangular pillar protruding toward the center from the inner peripheral surface of yoke 3b. Each of teeth 3a is wound by winding wires 5 by way of spool 4. Winding wire 5 comprises U-phase winding wire 5u, V-phase winding wire 5v, and W-phase winding wire 5w for each of the three phases, namely the U phase, V phase, and W phase.

Though not shown in detail, electric motor 1 is further provided with rotor 6. Rotor 6 comprises a substantially cylindrical rotor core made of a stack of multiple annular electromagnetic steel sheets and a rotary shaft passing through the rotor core so as to extend in the direction in which the electromagnetic steel sheets are stacked. Rotor 6 is disposed within the field area of stator 2 so as to be rotatable with respect to stator 2. More specifically, rotor 6 is disposed relative to stator 2 such that the outer peripheral surface of rotor 6 opposes the inner peripheral surface of stator 2 over a small air gap.

Figure 1:
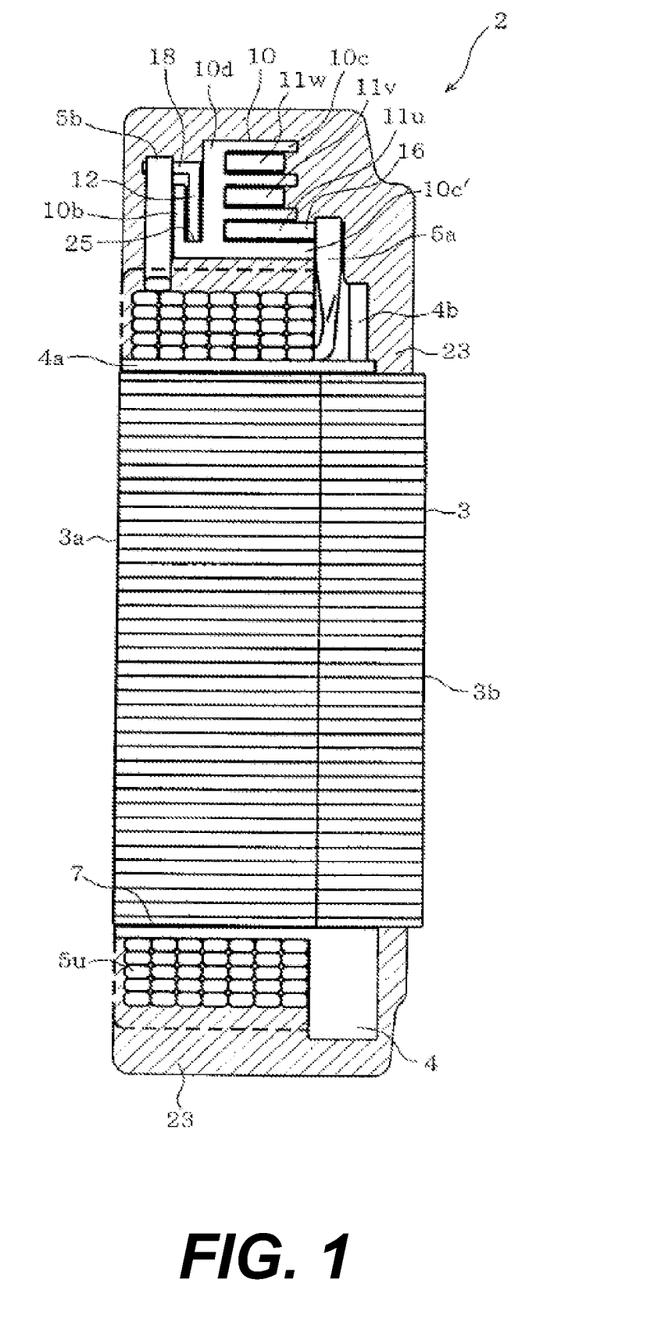
FIG. 1 is an enlarged cross sectional view of a stator shown with one embodiment of a holder member.
Figure 3:
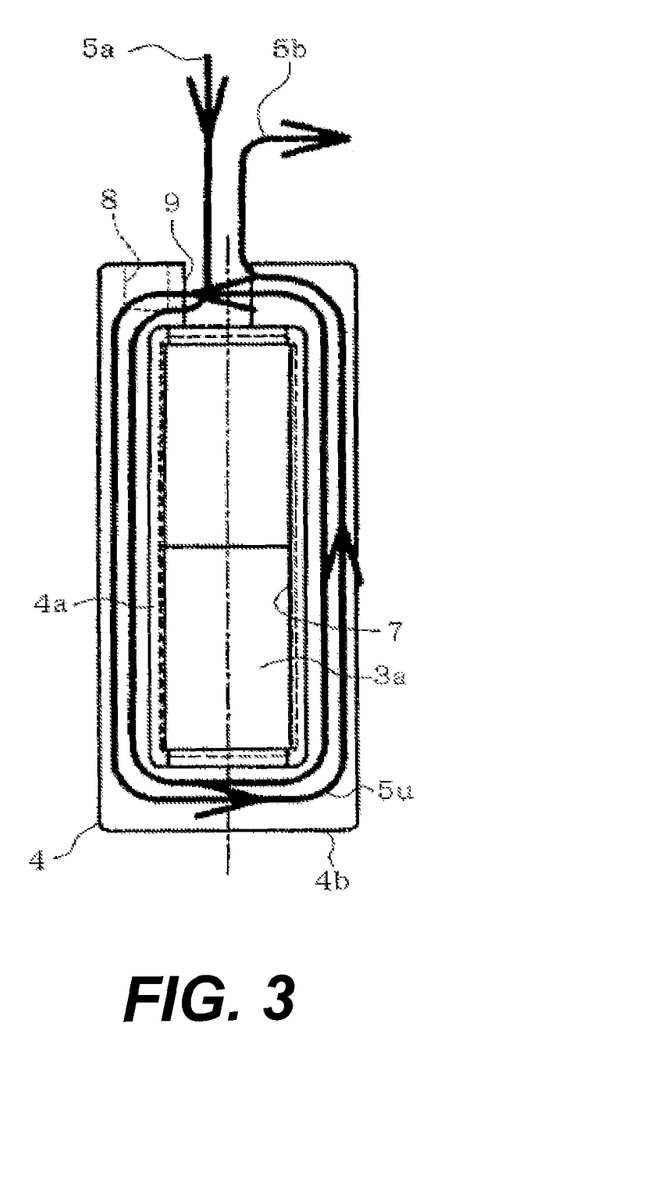
FIG. 3 shows how a winding wire is wound on a spool.

Spool 4 is an insulator for providing electric isolation. Spool 4 also serves as a bobbin molded by resin and includes waist 4a and flange 4b formed on one end of waist 4a that are structurally integral. FIG. 1 illustrates waist 4a of spool 4 wound by U-phase winding wire 5u. FIG. 3 illustrates spool 4 viewed from a radially inward side of stator core 3, hereinafter simply referred to as core 3 and further schematically illustrates winding wire 5u wound on spool 4. V-phase winding wire 5v and W-phase winding wire 5w are configured in the same way as U-phase winding wire 5u.

Figure 4A:
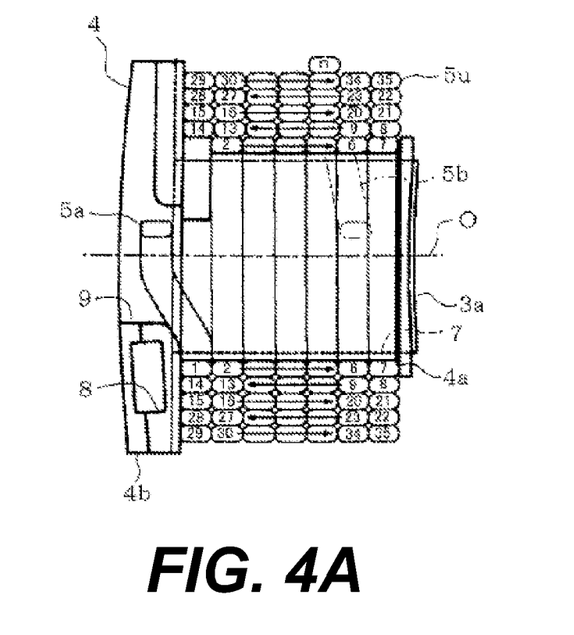
FIG. 4A is an enlarged view of the spool viewed from the axial direction of a stator core.
Figure 4B:
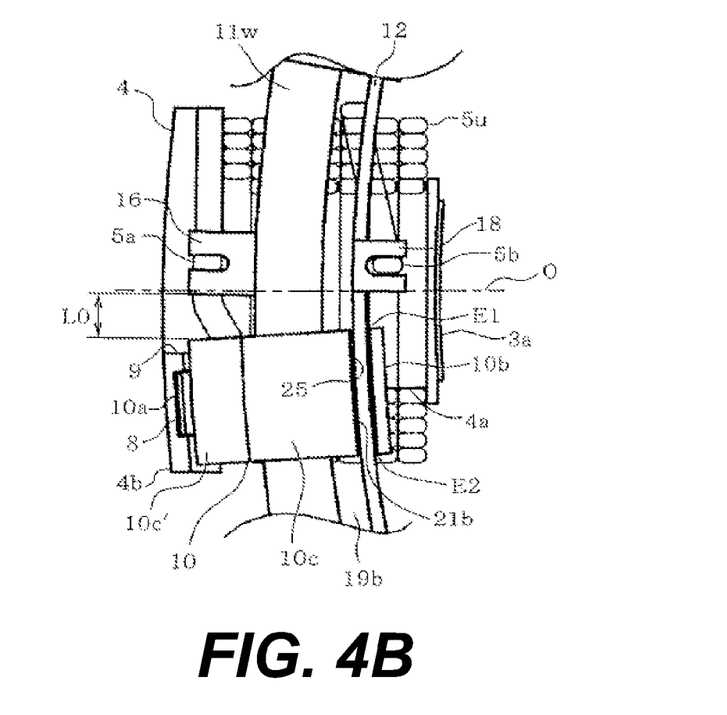
FIG. 4B is an enlarged view of the spool with the bus rings attached by way of the holder member.

As can be seen in FIGS. 1 to 3, waist 4a is shaped as a rectangular cylinder whereas flange 4b is shaped as a rectangle. Spool 4 is further provided with fitting hole 7 extending in the axial direction of waist 4a. Spools 4 are attached to core 3 by inserting teeth 3a through fitting holes 7. On flange 4b of spool 4, an axially caving engagement hole 8 is formed on one end of the upper side which is one axial side of core 3 as viewed in FIG. 2. Engagement hole 8 is located on the corner of flange 4b as can be seen in FIGS. 3, 4A, and 4B, and serves as one example of an engagement portion. Engagement leg 10a of a later described holder member 10 is pressed into engagement hole 8 to establish the engagement between engagement leg 10a and engagement hole 8.

On flange 4b of spool 4, notch 9 is formed on one end of its upper side which is one axial side of core 3 as viewed in FIG. 3. Notch 9 is located substantially at the lateral mid portion of said one end. Winding start end 5a of U-phase winding wire 5u is drawn out to the outer peripheral side, which is the left side as viewed in FIG. 4A, of spool 4 through notch 9 located at the substantial mid portion of waist 4a to be connected to connecting portion 16 of a later described U-phase bus ring 11u as shown in FIG. 4B. Engagement hole 8 and notch 9 of flange 4b are formed when spool 4 is resin molded in a die.

U-phase winding wire 5u is wound counterclockwise on waist 4a as viewed in FIG. 3 with winding start end 5a drawn out of notch 9. U-phase winding wire 5u is wound by a predetermined n (n is an integer) number of turns. More specifically, as indicated the by arrow of FIG. 4A, the winding proceeds in a first direction from the outer to inner peripheral side of core 3, i.e. the left to right side as viewed in FIG. 4A to complete the winding of the first layer. Then, the winding direction is reversed to proceed in the second direction, opposite the first direction, from the inner to outer peripheral side of core 3, i.e. the right to left side as viewed in FIG. 4A to complete the winding of the second layer. The same is repeated thereafter until n number of turns is reached. The reference symbols 1 to n indicate the winding sequence of O-phase winding wire 5u and O represents the central axis of spool 4.

Winding finish end 5b of O-phase winding wire 5u is located on a substantial mid portion where notch 9 is formed when spool 4 is viewed from the radially inward direction of core 3 and is connected to connecting portion 18 of neutral point bus ring 12 at a location relatively closer to the inner peripheral side, i.e. toward the right side in FIG. 4B. Thus, during assembly, winding start end 5a, i.e. first end, and winding finish end 5b, i.e. second end, of the U-phase winding wire 5u of spool 4 can be prevented from entangling with adjacent spools 4 or other winding wires 5v and 5w. Further, the winding of spool 4 with U-phase winding wire 5u takes place at a location slightly distanced from engagement hole 8, such that winding start end 5a and winding finish end 5b are distanced from holder member 10 engaged with engagement hole 8 as indicated by distance L0 shown in FIG. 4B. Thus, winding start end 5a and winding finish end 5b are prevented from interfering with holder member 10 during assembly. Both of the tips of winding start end 5a and winding finish end 5b are configured to be oriented toward one of the axial sides of core 3 which is illustrated as the direction normal to the page in FIG. 4B. The circumferential location of winding start end 5a coincides with the circumferential location of winding finish end 5b on the circumference of waist 4a of spool 4. FIG. 3 shows a slight displacement between winding start end 5a and winding finish end 5b for ease of explanation.

In the above described embodiment, winding finish ends 5b of each of winding wires 5u, 5v, and 5w are connected to neutral point bus ring 12, whereas winding start ends 5a of each of winding wires 5u, 5v, and 5w are connected to the corresponding bus rings, namely U-phase bus ring 11u, V-phase bus ring 11v, and W-phase bus ring 11w of the corresponding phase to establish a star connection of winding wires 5u, 5v, and 5w. The structure of each bus ring 11u, 11v, and 11w as well as holder member 10 that hold bus rings 11u, 11v, and 11w will be described hereinafter.

Each of bus rings 11u, 11v, 11w and 12 are made of conductive material such as copper alloy and are covered with insulative coating. Bus rings 11u, 11v, 11w, and 12, as will be later described in detail, establish selective electric connection with wire windings 5u, 5v, and 5w. U-phase bus ring 11u, V-phase bus ring 11v, and W-phase bus ring 11w constitute a first bus ring that differ in dimension from the neutral point bus ring 12. Bus rings 11u, 11v, and 11w are annular members dimensioned identically and each posses a flat main surface 15 orthogonal to the axial direction of core 3 as shown in FIG. 2. The radial dimension of bus rings 11u, 11v, and 11w is configured to be smaller the outer diameter of core 3 but greater than the inner diameter of core 3 so that, when assembled, overlaps with the base ends of teeth 3a located on the opposite side of the tips of teeth 3a as viewed from the axial direction of core 3. Bus rings 11u, 11v, and 11w are disposed with respect to holder member 10 such that main surfaces 15 of U-phase bus ring 11u and V-phase bus ring 11v oppose one another and main surfaces 15 of V-phase bus ring 11v and W-phase bus ring 11w oppose one another as shown in FIGS. 1 and 2. Bus rings 11u, 11v, and 11w are each provided with a plurality of bifurcated connecting portions 16 which are spaced by equal circumferential spacing of 45 degrees for example, and which serve as winding wire connecting portions. Connecting portions 16 project toward the outer peripheral side of bus rings 11u, 11v, and 11w and are structurally integral with bus rings 11u, 11v, and 11w. As shown in FIG. 5, bus rings 11u, 11v, and 11w are further provided with connecting terminals Pu, Pv, and Pw for receiving the U-phase, V-phase, and W-phase power supply, respectively. Connecting terminals Pu, Pv, and Pw are structurally integral with bus rings 11u, 11v, and 11w of the corresponding phase.

Neutral point bus ring 12 constitutes a second bus ring configured to have an outer diameter slightly greater than the inner diameter of the first bus rings, that is, bus rings 11u, 11v, and 11w. Neutral point bus ring 12 is an annular member in a belt like shape which is radially thin and axially thick. The axial direction indicates the axial direction of core 3. Neutral point bus ring 12 is provided with a plurality of bifurcated connecting portions 18 which are spaced by equal circumferential spacing of 15 degrees for example, and which serve as winding wire connecting portions. Connecting portions 18 project toward the inner peripheral side of bus ring 12 and are structurally integral with bus ring 12. Connecting portions 18 are in a reversed L shape as viewed in the cross sectional view of FIG. 1. As can be seen in FIG. 1, neutral point bus ring 12 is axially thick and, when the thickness of connecting portion 18 is combined, spans across the uppermost and the lowermost bus rings of the axial stack of bus rings 11u, 11v, and 11w held by holder member 10.

The holder, also referred to as a holder for use with stator, for holding bus rings 11u, 11v, and 11w is configured by holder member 10. In one embodiment, 24 holder members 10 are provided which is equal to the number of spools 4. Holder member 10 will be described in detail with reference to FIGS. 6A and 6B which provide enlarged views of holder member 10.

Holder member 10 generally appears as a collection of shelves as shown in FIG. 6B, and is provided with elements such as an engagement leg 10a described earlier for mounting purposes. More specifically, holder member 10 is an integral structure made by injection molding and includes fitting protrusions 10c and 10c', projecting piece 10b for supporting neutral point bus ring 12, partition wall 10d that integrally join protruding piece 10d and fitting protrusions 10c, and engagement leg 10a. Holder member 10 is made of bendable resin material such as PPS (polyphenylene sulfide) or nylon and also serves as a spacer that secures space for providing insulation between bus rings 11u, 11v, 11w, and 12.

More specifically, fitting protrusions 10c and 10c' are examples of a first support portion that supports bus rings 11u, 11v, and 11w in alignment with the axial direction of core 3. As shown in FIG. 6A, fitting projections 10c and 10c' protrude from one side, also referred to as a first side, of surface 21a of partition wall 10d so as to appear as multiple shelves. The length L1 of protrusion is configured to be greater than the width of bus rings 11u, 11v, and 11w exclusive of the width of connection portion 16. Further, thickness t1 of fitting protrusions 10c and 10c' is configured to be slightly less than the spacing between fitting protrusions 10c and 10c'. Fitting protrusions 10c and 10c' hold bus rings 11u, 11v, and 11w therebetween. Fitting protrusion 10c allows spacing amounting to thickness t1 of fitting protrusion 10c to be provided between bus rings 11u, 11v, and 11w respectively while keeping the axially stacked arrangement of bus rings 11u, 11v, and 11w as compact as possible. On the portion near the tip of the lowermost fitting protrusion 10c' as viewed in FIG. 6A, engagement leg 10a is provided. Fitting protrusion 10c' protrudes by length L1' which is greater than length L1 of other fitting protrusions 10c. Length L1' of fitting protrusion 10c' is configured to be at least greater than the width of bus ring 11u inclusive of connecting portion 16 as can be seen in FIGS. 1 and 6A. The above configuration allows each of bus rings 11u, 11v, and 11w to be held at a location radially inward from engagement hole 8 of spool 4.

Referring to FIG. 6B, protruding piece 10b protrudes from the second side of the partition wall 10d in a direction opposite the direction in which fitting protrusions 10c and 10c' protrude. Still referring to FIG. 6B, protruding piece 10b extends, from its midway portion 10e, in a direction parallel to partition wall 10d and intersecting with direction D in which fitting protrusions 10c and 10c' extend. As described above, direction D is a direction that intersects with the direction in which fitting protrusions 10c and 10c' extend or protrude. Protruding piece 10b is bent at its midway portion 10e so as to be oriented in a direction in which fitting protrusions 10c are aligned. Protruding piece 10b and surface 21b on the second side of partition wall 10d define a fitting groove 25 therebetween which opens toward a tip of protruding piece 10b and which holds neutral point bus ring 12 within it. Protruding piece 10b is one example of a second support portion. As described above, protruding piece 10b serves as the second support portion that supports neutral paint bus ring 12 at a location radially inward of bus rings 11v, 11v, and 11w by fitting neutral point bus ring 12 into fitting groove 25 from the opened side of fitting groove 25.

Fitting groove 25 caves downward, as viewed in FIG. 6A, along surface 21b on the second side of partition wall 10d. Protruding piece 10b is further provided with a sloped portion 22 extending from midway portion 100 to its tip. FIG. 6A shows an exaggerated image of sloped portion 22 being slightly inclined with respect to partition wall 10d such that fitting groove 25 defined between protruding piece 10b and surface 21b on the second side of partition wall 10d becomes wider toward the tip of protruding piece 10b. Thus, in assembly, neutral point bus ring 12 is fitted into fitting groove 25 by pressing the bottom side of neutral point bus ring 12 downward, as viewed in FIG. 6A, in contact with sloped portion 22. FIG. 5 shows and example in which 24 holder members 10 are used with holder members 10 being annularly disposed such that protruding piece 10b is oriented upward. As described earlier, neutral point bus ring 12 is fitted into fitting groove 25 from the opened side of fitting groove 25. Because neutral point bus ring 12 is made of metal and is thick in the axial direction of core 3 to exhibit a belt like shape, it is not easily deformed by external force. As neutral point bus ring 12 is fitted into fitting groove 25, a force to spread open bus rings 11u, 11v, and 11w is exerted by way of the flexible partition wall 10d to prevent bus rings 11u, 11v, and 11w from being radially displaced.

As shown in FIG. 4B, fitting groove 25 is formed substantially in a straight line extending along surface 21b on the second side of partition wall 10d and in direction D oriented substantially in the up and down direction as viewed in FIG. 4B. Accordingly, neutral point bus ring 12 being fitted into fitting groove 25 contacts the two ends E1 and E2 of fitting groove 25 to prevent circumferential movement of neutral point bus ring 12 relative to holder member 10. As described above and shown in FIG. 5, by arranging bus rings 11u, 11v, 11w, and 12 into a unit i.e., bus ring unit 20 by holding them with holder member 10, circumferential and radial displacement between bus rings 11u, 11v, 11w, and 12 is prevented.

Partition wall 10d serves as a partition to part neutral point bus ring 12 from bus rings 11u, 11v, and 11w. As shown in FIG. 6A, thickness t2 of partition wall 10d is configured to be greater than thickness t1 of fitting protrusions 10c and 10c' (t2>t1) and is configured to provide a predetermined distance of insulation between neutral point bus ring 12 and bus rings 11u, 11v, and 11w. To summarize, fitting protrusion 10c of holder member 10 serves as a spacer that provides spacing, identified by reference symbol 19a in FIG. 5, between bus rings 11u, 11v, and 11w, whereas partition 10d serves as a spacer that provides spacing, identified by reference symbol 19b in FIG. 4B, between bus rings 11u, 11v, 11w, and 12. Spacing 19a and 19b, when filled with later described resin 23, achieves electric isolation between bus rings 11u, 11v, 11w, and 12.

Engagement leg 10a is one example of an engagement piece and is introduced into engagement hole 8 from the axial direction of core 3. Engagement leg 10a is provided at the tip of fitting protrusion 10c' so as to protrude in the direction opposite the opened side of fitting groove 25. Though not shown in detail on the other hand, engagement hole 8 of spool 4 is shaped as a narrowing taper. Thus, engagement leg 10a is pressed into engagement with engagement hole 8. During the assembly of stator 2, engagement leg 10a, proceeding along engagement hole 8, serves as a guide member that guides bus ring unit 20 in the axial direction of core 3.

Next, a description will be given on the procedures in assembling stator 2 and on how bus rings 11u, 11v, 11w, and 12 are connected with winding wire 5.

First, winding wires 5u, 5v, and 5w are prepared that are identical in structure so that they may be wound on the spool 4 in the same way as described earlier such that location of winding start end Se and winding finish end 5b of the wound winding wires 5u, 5v, and 5w are identical. Spools 4 wound with winding wire 5 are attached to teeth 3a of cores 3 from the inner peripheral side of core 3. As can be seen in FIG. 2, engagement hole 7 of spool 4 is configured to receive teeth 3a and thus, is attached firmly to core 3 without play.

The assembly of bus rings 11u, 11v, 11w, and 12, on the other hand, may be carried out as follows in a separate step. Bus rings 11u, 11v, and 11w are fitted between fitting protrusions 10c and 10c' of each holder member 10. When using multiplicity of holder members 10, such as the 24 pieces of holder members 10 in the above described embodiment, an equipment not shown may be used to facilitate the attachment of bus rings 11u, 11v, and 11w to holder members 10. For instance, holder members 10 may be disposed annularly with equal spacing on the equipment such that protruding pieces 10b are oriented upward and bus rings 11u, 11v, and 11w may be attached to holder members 10. The circumferential location of each of bus rings 11u, 11v, and 11w is configured such that each of connecting portions 16 is distanced from holder member 10 by predetermined distance LO shown in FIG. 4B and distanced from one another by 15 degrees.

Then, neutral point bus ring 12 is fitted into fitting groove 25 of each holder member 10 from the upper side such that the circumferential location of connecting portion 18 of neutral point bus ring 12 coincides with the circumferential location of connecting portion 16 of bus rings 11u, 11v, and 11w. At this instance, neutral point bus ring 12 is pressed into fitting engagement with fitting groove 25 by allowing the lower end of neutral point bus ring 12 to contact sloped portion 22. As neutral point bus ring 12 is fitted into fitting groove 25, a force to spread open bus rings 11u, 11v, and 11w is exerted by way of the flexible partition wall 10d to prevent bus rings 11u, 11v, and 11w from being radially displaced. As a result, neutral point bus ring 12 and bus rings 11u, 11v, and 11w maintain their coaxial positioning with respect to one another while being arranged into a unit referred to as bus ring unit 20 by holder member 10 as shown in FIG. 5. When arranged into a unit as described above, neutral point bus ring 12 contacts the two ends E1 and E2 of fitting groove 25 to prevent circumferential movement of neutral point bus ring 12 relative to holder member 10 while preventing circumferential and radial displacement of bus rings 11u, 11v, 11w, and 12.

Then, bus ring unit 20 is attached to core 3. In doing so, bus ring unit 20 is located with core 3 such that connecting portions 16 of bus rings 11u, 11v, and 11w are located above the corresponding winding wires 5u, 5v, and 5w. Further, engagement legs 10a of holder members 10 of bus ring unit 20 is located with engagement holes 8 of spools 4 and inserted into them. At this instance, attachment of bus ring unit 20 to core 3 is facilitated by the guidance provided by engagement leg 10a and engagement hole 8. More specifically, engagement leg 10a proceeds along engagement hole 8 to guide bus ring unit 20 in the axial direction of core 3 and is fitted into engagement hole 8 to allow bus ring unit 20 to be secured on core 3. The above attachment further prevents spools 4 attached to teeth 3a from moving in the radial direction of core 3.

Bus ring unit 20, when attached, is located with respect to core 3 such that connecting portions 16 of bus rings 11u, 11v, and 11w are located with winding start ends 5a of winding wires 5u, 5v, and 5w of the corresponding phase and connecting portions 18 of neutral point bus ring 12 are located with winding finish ends 5b of winding wires 5u, 5v, and 5w as shown in FIG. 4B. The above described attachment of bus ring unit 20 to core 3 allows winding start ends 5a and winding finish ends 5b of winding wires 5u, 5v, and 5w to be readily inserted into connecting portions 16 and 18 of each of bus rings 11u, 11v, 11w, and 12 without having to draw winding start ends 5a and winding finish ends 5b of winding wires 5u, 5v, and 5w to their corresponding connecting portions 16 and 18.

The two ends 5a and 5b of each winding wire 5 is fixed to the corresponding connecting portions 16 and 18 by fusing i.e., thermal caulking, for example. Because spacing LO is provided between connecting portions 16 and 18 and holder member 10 of bus ring unit 20, holder member 10 can be prevented from being affected by heat involved in the fusing. Employing other approaches such as TIG (Tungsten Inert Gas) welding may also establish a strong electrical connection between ends 5a and 5b of winding wires 5 and connecting portions 16 and 18. Then, insulative resin 23 is molded as shown in FIG. 1 to complete the formation of stator 2. As a result, bus ring unit 20 is buried in resin 23 such that resin 23 fills spacing 19b shown in FIG. 4B and spacing 19a shown in FIG. 5 residing between bus rings 11u, 11v, 11w, and 12 that are not held by holder member 10 to secure bus rings 11u, 11v, 11w, and 12 while providing insulation between them.

FIG. 7 is a functional block diagram schematically illustrating the configuration of an electric automobile provided with a system for driving electric motor 1 employed for running the electric automobile. FIG. 7 illustrates chassis 100 of the automobile which may be more generally referred to as body 100 and assembled battery pack 200. Battery pack 200 contains one or more assembly batteries not shown. Battery pack 200 is provided with a plus electrode and a minus electrode that includes an inverter and is connected to voltage conversion and operation controller 300. Voltage conversion and operation controller 300 controls the level output current and output voltage based on incoming operation commands. The output from voltage conversion and operation controller 300 delivered to electric motor 1 serves as an electric power for driving electric motor 1.

Body 100 has right wheel WR and left wheel WL serving as drive wheels mounted on it. Wheels WR and WL are driven by the drive force outputted by electric motor 1. More specifically, the rotation of electric motor 1 is transmitted to wheels WR and WL by mechanisms such as a differential gear unit. Body 100 further contains battery managing substrate 400 which is responsible for battery management and is provided with circuitry for performing communication. The circuitry may include components such as controller, communication interface, and storage.

Stator 2 of the above described embodiment is provided with a holder for holding first and second bus rings having different radial dimensions. The holder comprises a first support portion that is configured to hold a plurality of first bus rings aligned in the axial direction of core 3 and a second support portion that is configured to support the second bus ring on a radially inward side of the first bus ring.

According to the above described configuration, the holder supports the plurality of first bus rings so that they are aligned in the axial direction and the second bus ring so as to reside along the inner periphery of the first bus ring. As a result, the first bus rings and the second bus ring having different radial dimensions may be disposed in relatively smaller axial and radial spaces which in turn reduces the axial and radial dimensions of stator 2. The same advantages may be obtained even when the radial dimension of the second bus ring is configured to be relatively greater than the radial dimension of the first bus rings and the second support portion is configured to support the second bus ring on the radially outward side of the first bus rings.

Electric motors of electric automobiles typically apply or use relatively higher voltage in order to obtain high output in a compact configuration. In this respect, the first bus rings are each configured as an annular member having a main surface orthogonal to the axial direction of stator core 3 and the second bus ring is configured as an annular member shaped like a belt that has a main surface substantially parallel to the axial direction of stator core 3. The main surface of the second ring is configured to be relatively wide in the axial direction.

As a result, the plurality of first bus rings are arranged such that the main surfaces of the axially adjacent first bus rings oppose one another, thereby minimizing the axial space required for the first support portion to support the first bus rings. Further, the second bus ring having a main surface, i.e. relatively wide surface, along the axial direction is disposed along the inner side or the outer side of the first bus ring. Thus, radial space required to support first and the second bus rings can be minimized. As a result, stator 2 can be made even more compact while creating room in the axial direction and the radial direction of each bus ring. The earned spaciousness allows the distance between the plurality of first bus rings and the distance between the first bus rings and the second bus ring to be increased to improve the performance of insulation and increase the level of applied voltage. Further, the second bus ring is relatively wider in the axial direction of stator core 3, that is, in the direction in which the first bus rings are aligned which makes the second bus ring relatively difficult to deform. As a result, radial displacement of the plurality of first bus rings supported by the first support portion can be inhibited by utilizing the rigidity of the second bus ring supported by the second support portion.

The holder for use with a stator comprises a partition wall, a first support portion, and a second support portion. The first support portion protrudes in a first direction, from a first side of the partition wall, in a form of multiple shelves. The second support portion comprises a protruding piece. The protruding piece protrudes in a second direction opposite the first direction, from a second side of the partition wall. The protruding piece extends, from a midway portion thereof, in a third direction parallel to the partition wall and intersects with a fourth direction in which the multiple shelves extend, to define a fitting groove between the second side of the partition wall and the protruding piece. The fitting groove opens toward a tip of the protruding piece.

The above configuration may be utilized as follows.

The first support portion may be disposed annularly with the first support portion facing radially outward. Annular members, one example of which may be the first bus rings, may be inserted between the shelves of the first support portion so as to be held by it. Another set of annular member, one example of which may be a second bus ring, and having a radial dimension less than the annular member of the first support portion may be inserted from the opened side of groove 25 of the second support portion to be held by the second support portion. The stator holder holding the annular members may then be attached to stator core 3.

As the annular member is inserted into groove 25 of the second support portion, a force to spread out the annular members is exerted from inward to outward by way of partition wall 10d to prevent the plurality of annular members from being radially displaced. The holder for use with a stator configured as described above allows the annular members having different radial dimensions to maintain their coaxial positioning with respect to one another. A plurality of annular members having different radial dimensions may be supported effectively using a stator holder having a relatively simple structure including a shelf configuration or protruding piece 10b protruding from partition wall 10d. Each of the annular members is supported so as to be distanced from one another as much as the thickness of the first support portion or partition wall 10d. Thus, the stator holder may serve as a spacer for isolating the annular members. The effects similar to those discussed above can be obtained by even when the first support portion is disposed annularly with the first support portion facing radially inward and the radial dimension of the annular member supported by the second support portion is configured to be relatively greater than the radial dimension of the annular member supported by the first support portion.

The holder for use with a stator, also referred to as a holder, may be configured as a single, generally annular holder member comprising at least the first support portion and the second support portion.

In this respect, in the above described embodiment, a plurality of holder members 10 are provided along the alignment of each winding wire 5 wound on stator core 3. Partition wall 10d parts the plurality of first bus rings and the second bus ring and extends in the axial direction of stator core 3. Fitting protrusions 10c and 10c' fit with the plurality of first bus rings and serve as the first support portion. Fitting piece 10b serves as the second support portion defining fitting groove 25 with which the second bus ring is fitted.

Even when the holder is configured by a plurality of holder members 10 provided along the alignment of each winding wire 5 wound on stator core 3, the plurality of first bus rings supported by the first support portion can be held securely together from the radially inward side or radially outward side without dislocating by the second bus ring inserted into fitting groove 25 from the axial direction and by way of partition wall 10d. As a result, the plurality of first bus rings and the second bus ring maintain their coaxial positioning with respect to one another while being fitted into their respective support portions and are arranged into a unit referred to as bus ring unit 20 by holder member 10. Thus, bus ring unit 20 alone may be assembled in a separate step to streamline the assembly work.

As further described in the above described embodiment, first end 5a of each of winding wires 5u, 5v, and 5w is connected to bus rings 11u, 11v, and 11w of the corresponding phase and second end 5b of each of winding wires 5u, 5v, and 5w is connected to neutral point bus ring 12.

Thus, the holder is configured by a plurality of holder members 10 provided along the alignment of each of winding wires 5u, 5v, and 5w which are wound on stator core 3 for each of the U phase, V phase and W phase. Each of bus rings 11u, 11v, and 11w for the U phase, V phase and W phase are connected with winding wires 5u, 5v, and 5w of the corresponding phase and bus rings 11u, 11v, and 11w are held by the shelves of the first support portion. Neutral point bus ring 12 to which all 3 phases of winding wires 5u, 5v, and 5w are connected is held by groove 25 of the second support portion.

In the above described configuration, the holder allows the coaxial positioning, along the alignment of winding wires 5u, 5v, and 5w, of bus rings 11u, 11v, and 11w and neutral point bus ring 12 to be maintained. Because the above described relative positioning between bus rings 11u, 11v, and 11w and winding wires 5u, 5v, and 5w are guaranteed, winding start end 5a and winding finish end 5b of winding wires 5u, 5v, and 5w may be configured as illustrated in FIG. 4A for all phases, namely the U phase, V phase and W phase, which allows each of winding wires 5u, 5v, and 5w to be identical in structure. Because the positioning of winding start end 5a and winding finish end 5b of each of winding wires 5u, 5v, and 5w need not be changed on a case by case basis, the connecting of winding wires 5u, 5v, and 5w to bus rings 11u, 11v, and 11w and neutral point bus ring 12 can be facilitated.

Stator 2 is provided with spool 4 which is made of resin and which is wound with winding wire 5. Spool 4 is configured to insulate stator core 3 and winding wire 5. Spool 4 includes an engagement portion which is made of resin and which is configured to allow engagement of holder member 10 from the axial direction of stator core 3. Thus, engagement portion can be formed with ease when resin molding spool 4 to provide a low cost and simple configuration. Further, by utilizing spool 4 that insulates stator core 3 and winding wire 5, engagement portion exemplified as engagement hole 8 in the above described embodiment can be formed near winding wire 5. Further, unit 20 can be attached to one axial end of stator core 3 by engaging holder member 10 with engagement portion and thus, assembly work can be facilitated.

Holder is provided with an engagement piece that protrudes in a direction opposite a direction toward which the groove opens. When, the engagement piece of holder is inserted into engagement hole with the engagement piece facing the downward direction, neutral point bus ring 12 will not fall out from groove 25 because it is fitted into groove 25 which is opened toward the upward direction. This further facilitates the assembly work.

Regarding holder member 10, length L1' of fitting protrusion 10c' which is provided with engagement leg 10a is configured to be at least greater than the widths of bus rings 11u, 11v, and 11w. This allows bus rings 11u, 11v, 11w and 12 to be held without extending radially outward beyond the insulator. Thus, bus rings 11u, 11v, 11w and 12 are prevented from protruding to the outer peripheral side of stator core 3 to keep stator 2 radially compact.

Holder member 10 may alternatively eliminate engagement leg 10 and replace engagement hole 8 provided on spool 4 with a groove for engaging the hold member without engagement leg 10a. Further, the downwardly oriented engagement leg 10a provided on holder member 10 as viewed in FIG. 6A may be replaced by an upwardly oriented engagement leg provided on the uppermost fitting protrusion 10c as viewed in FIG. 6A. This means that engagement leg serving as the engagement piece may take different structures as long as it is configured to extend, with respect to holder member 10, in the direction in which fitting protrusions 10c and 10c' are aligned.

Further in the above described embodiment, winding wire 5 was wound on spool 9 such that winding start end 5a and winding finish end 5b of winding wire 5 are located substantially at the lateral mid portion of one end of spool 4 where notch 9 is formed. Alternatively, winding start end 5a and winding finish end 5b of winding wire 5 may be placed in any other location as long as they do not interfere with the assembly of holder member 10 and are not thermally affected by thermal processing such as fusing. Thus, the location of winding start end 5a and winding finish end 5b of winding wire 5 on spool 4 may be modified as required depending upon the relative positioning with respect to engagement hole 8 for engaging holder member 10. Further, engagement hole 8 formed on the upper left corner of flange 4b as viewed in FIG. 3 may be formed on the upper right corner of flange 4b as viewed in FIG. 3.

The number of holder members 10 may be modified as appropriate depending upon the number of spools 4 or teeth 3a.

The application of electric motor 1 is not limited to electric automobiles as described in the above described embodiment but may be applied to other types of automobiles such as hybrid automobiles that are provided with wheels that can be driven by the drive force outputted by electric motor 1.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A stator of a rotating machine comprising:
a stator core;
a plurality of winding wires wound on the stator core;
a plurality of first bus rings each having a first radial length and selectively establishing electrical connection with each of the winding wires;
a second bus ring having a second radial length different from the first radial length and located closer to a center axis of the stator core than the first bus rings and selectively establishing electrical connection with each of the winding wires; and
a holder device holding the first bus rings and the second bus ring, the holder device including:
a first support portion supporting the plurality of first bus rings aligned along an axial direction of the stator core;
a second support portion supporting the second bus ring on a radially outward side or a radially inward side of the first bus rings; and
an engagement piece extending in a direction opposite the second support portion, said engagement piece formed monolithically with the first and second support portions.

2. The stator according to claim 1, wherein the plurality of first bus rings each comprises an annular member having a main surface orthogonal to the axial direction of the stator core, and the second bus ring comprises a belt-shaped annular member being relatively wide in the axial direction of the stator core.

3. The stator according to claim 2, wherein the holder device comprises a plurality of holder members disposed along the alignment of each of the winding wires wound on the stator core, each of the holder members comprising:
a partition wall parting the plurality of first bus rings and the second bus ring and extending in the axial direction of the stator core,
a fitting protrusion serving as the first support portion and protruding in a first direction, from a first side of the partition wall, in a form of multiple shelves fitting with the plurality of first bus rings,
a protruding piece serving as the second support portion and protruding in a second direction opposite the first direction, from a second side of the partition wall, the protruding piece extending, from a midway portion thereof, in a third direction parallel to the partition wall and intersecting with a fourth direction in which the multiple shelves extend, thereby defining a fitting groove between the second side of the partition all and the protruding piece, the fitting groove opening toward a tip of the protruding piece and establishing a fitting engagement with the second bus ring.

4. The stator according to claim 3, further comprising a resin-made spool wound by the winding wire and insulating the stator core and the winding wire, the spool including a resin-molded engagement portion allowing engagement of the holder member from the axial direction of the stator core.

5. The stator according to claim 1, wherein the holder device comprises a plurality of holder members disposed along the alignment of each of the winding wires wound on the stator core, each of the holder members comprising:
a partition wall parting the plurality of first bus rings and the second bus ring and extending in the axial direction of the stator core,
a fitting protrusion serving as the first support portion and protruding in a first direction, from a first side of the partition wall, in a form of multiple shelves fitting with the plurality of first bus rings,
a protruding piece serving as the second support portion and protruding in a second direction opposite the first direction, from a second side of the partition wall, the protruding piece extending, from a midway portion thereof, in a third direction parallel to the partition wall and intersecting with a fourth direction in which the multiple shelves extend, thereby defining a fitting groove between the second side of the partition wall and the protruding piece, the fitting groove opening toward a tip of the protruding piece and establishing a fitting engagement with the second bus ring.

6. The stator according to claim 5, further comprising a resin-made spool wound by the winding wire and insulating the stator core and the winding wire, the spool including a resin-molded engagement portion allowing engagement of the holder member from the axial direction of the stator core.

7. A rotating machine comprising the stator according to claim 1 and a rotor disposed in a field area of the stator.

8. An automobile comprising the rotating machine according to claim 7 and a wheel capable of being driven by a drive force outputted by the rotating machine.

9. A holder for use with a stator comprising:
a partition wall;
a first support portion protruding in a first direction, from a first side of the partition wall, in a form of multiple shelves; and
a second support portion comprising a protruding piece protruding in a second direction opposite the first direction, from a second side of the partition wall, the protruding piece extending, from a midway portion thereof, in a third direction parallel to the partition wall and intersecting with a fourth direction in which the multiple shelves extend, thereby defining a fitting groove between the second side of the partition wall and the protruding piece, the fitting groove opening toward a tip of the protruding piece; and
an engagement piece protruding in a fifth direction opposite the third direction toward which the fitting groove opens, said engagement piece formed monolithically with the first and second support portions.

10. A stator for a rotary machine comprising the holder according to claim 9, wherein two or more holders are disposed along an alignment of each of U phase, V phase, and W phase winding wires being wound on a stator core, and
wherein each of the shelves of the first support portion of each holder holds U phase, V phase, and W phase bus rings each being connected to the U phase, V phase, and W phase winding wires of the corresponding phase and the fitting groove of the second support portion of each holder holds a neutral point bus ring connected to each of the U phase, V phase, and W phase winding wires.

11. A stator for a rotary machine comprising the holder according to claim 9, wherein two or more holders are disposed along an alignment of each of U phase, V phase, and W phase winding wires being wound on a stator core, and
wherein each of the shelves of the first support portion of each holder holds U phase, V phase, and W phase bus rings each being connected to the U phase, V phase, and W phase winding wires of the corresponding phase and the fitting groove of the second support portion of each holder holds a neutral point bus ring connected to each of the U phase, V phase, and W phase winding wires.

* * * * *